United States Patent
Benvenuto et al.

(10) Patent No.: US 10,181,100 B1
(45) Date of Patent: Jan. 15, 2019

(54) HIERARCHICAL CLUSTERING METHOD AND APPARATUS FOR A COGNITIVE RECOGNITION SYSTEM BASED ON A COMBINATION OF TEMPORAL AND PREFRONTAL CORTEX MODELS

(71) Applicant: HRL Laboratories, LLC, Malibu, CA (US)

(72) Inventors: James Benvenuto, Beverly Hills, CA (US); Suhas E. Chelian, Encino, CA (US); Rajan Bhattacharyya, Sherman Oaks, CA (US); Matthias Ziegler, Agoura Hills, CA (US); Michael D. Howard, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 693 days.

(21) Appl. No.: 14/203,083

(22) Filed: Mar. 10, 2014

Related U.S. Application Data

(60) Provisional application No. 61/780,404, filed on Mar. 13, 2013.

(51) Int. Cl.
*G06N 3/04* (2006.01)
*G06N 5/04* (2006.01)

(52) U.S. Cl.
CPC .............. *G06N 5/047* (2013.01); *G06N 3/04* (2013.01)

(58) Field of Classification Search
USPC .................................................... 706/48, 45
See application file for complete search history.

(56) References Cited

PUBLICATIONS

Taylor, et al., Pose-Sensitive Embedding by Nonlinear NCA Regression, Courant Institute of Mathematics, New York University, 2010, pp. 1-9.*

Maimone, et al., Overview of the Mars Exploration Rovers' Autonomous Mobility and Vision Capabilities, IEEE International Conference on Robotics and Automation (ICRA) Space Robotics Workshop, Roma, Italy, Apr. 14, 2007, pp. 1-8.*

Barry, XCS Performance and Population Structure in Multi-Step Environments, Doctoral Thesis, Queens University, Belfast, 2000, pp. 1-385 (Year: 2000).*

(Continued)

*Primary Examiner* — Wilbert L Starks
(74) *Attorney, Agent, or Firm* — Tope-McKay & Associates

(57) ABSTRACT

Described is system and method for cognitive recognition. The system receives a multi-dimensional scene array as input data. A foveation module divides the multi-dimensional scene array into a plurality of sub-arrays and outputs contents of a currently selected sub-array. The contents are clustered with a hierarchical clustering module to generate a spatially invariant hierarchical cluster of the contents comprising a plurality of components which are based on a statistical distribution of co-occurrence of features across the currently selected sub-array. Task-relevant components are selectively gated and robustly maintained into a component memory location of a pattern bank with a working memory module with an input gating module. If the task-relevant components activate an abstract category module based on pattern matching, then a category recognition label is generated for the contents of the currently selected sub-array with an executive control module.

21 Claims, 16 Drawing Sheets

(56) References Cited

PUBLICATIONS

O'Reilly, Randall C., and Yuko Munakata. Computational explorations in cognitive neuroscience: Understanding the mind by simulating the brain. Bradford Book, 2000. Chapter 3.

O'Reilly, Randall C., and Yuko Munakata. Computational explorations in cognitive neuroscience: Understanding the mind by simulating the brain. Bradford book, 2000. Chapter 4.

Riesenhuber, M. & Poggio, T. (1999). Hierarchical Models of Object Recognition in Cortex. Nature Neuroscience 2: 1019-1025.

Ambros-Ingerson, J., Granger, R., and Lynch, G. (1990). Simulation of paleocortex performs hierarchical clustering. Science, 247: 1344-1348.

Rodriguez, A., Whitson, J., Granger, R. (2005). Derivation and analysis of basic computational operations of thalamocortical circuits. Journal of Cognitive Neuroscience, 16: 856-877.

Shai, Alumit and Ungerleider, Leslie G. and Martin, Alex and Schouten, Jennifer L. and Haxby, James V. (1999), Distributed representation of objects in the human ventral visual pathway. Proceedings of the National Academy of Sciences, 98: 9397-9384.

Brad Aisa. Brian Mingus, and Randy O'Reilly. The emergent neural modelng system. Neural Networks, 21(8):1146-1152, Oct. 2008.

S.E. Chelian, R. Bhattacharyya, and R. O'Reilly. Learning categories with invariances in a neural network model of prefrontal cortex. In Proceedings of the Second Annual Meeting of the BICA Society, (BICA 2011), pp. 50-55, Arlington, VA, 2011.

Mike Daily, Jerry Isdale, Howard Neely, and Julius Bogdanowicz. Performance analysis of a cognitive analogical reasoner. 2008.

J. L. Elman. Finding structure in time, Cognitive Science, 14:179-211, 1990.

F. A. Gers, J. Schmidhuber, and F. Cummins. Learning to forget: Continual prediction with lstm. Neural Computation, 12:2451-2471, 2000.

S. Hochreiter andJ. Schmidhuber. Long short term memory, Neural Computation 9:1735-1780, 1997.

J. E. Hummel and K. J. Holyoak. Distributed representations of structure: A theory analogical access and mapping. Psychological Review, 104:427-469, 1997.

Randall C O'Reilly and Michael J Frank. Making working memory work: A computational model of learning in the prefrontal cortex and basal ganglia. Neural Computation, 18(2):283-328, Dec. 2006.

W. Maass. On the computational power of winner-take-all, Neural Computation, 12:11, 2000.

Falkenhainer, B. Forbus, K and Gentner, D: 1989, "The structure-mapping engine: Algorithm and examples". Artificial Intelligence, 20(41): 1-63.

Rumelhart, David E.; Hinton, Geoffrey E., Williams, Ronald J. (Oct. 8, 1986). "Learning representations by back-propagating errors". Nature 323 (6088): 533-536.

\* cited by examiner

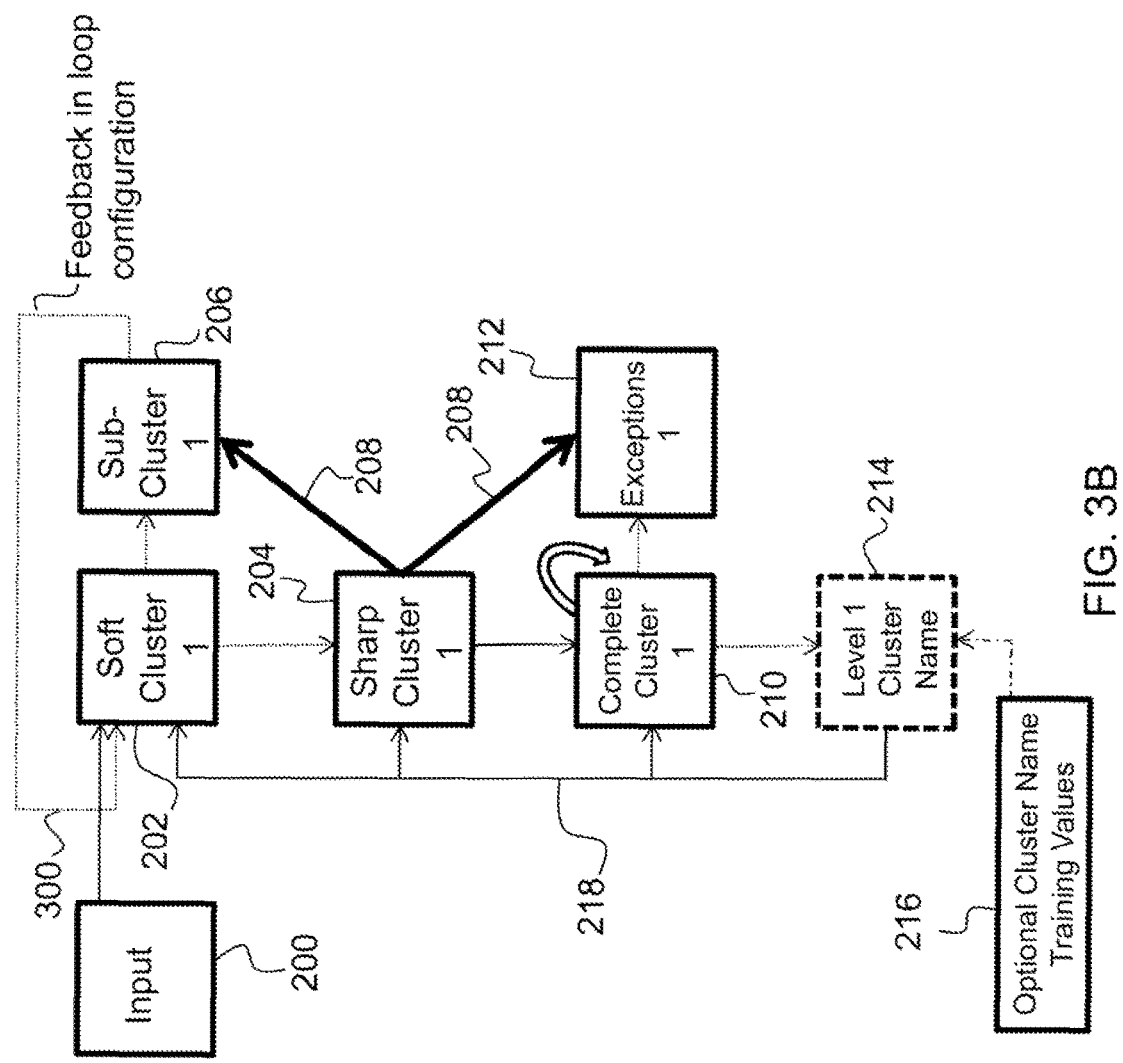

| SF | Bld1 | Bld2 | Bld3 | Bld4 | Bld5 | Bld6 | Bld7 | W1 | W2 |
|---|---|---|---|---|---|---|---|---|---|
| 1 | X | X |   |   |   |   |   |   |   |
|   | X | X | x |   |   |   |   |   |   |
|   | X |   | X | x |   |   |   |   |   |
|   | X |   | X |   |   |   |   |   |   |
| 2 |   | X | X | X |   | X |   | x |   |
|   |   | X | X | X |   |   |   |   |   |
| 3 |   |   | X | X | x | x |   | x | x |
|   | X |   | X | X |   |   |   | x | x |
| 4 |   | X |   | X | X |   |   |   |   |
|   |   |   |   | X | X |   |   | X |   |
| 5 |   |   |   |   | X |   |   | X |   |
|   |   |   |   |   | X | X | X | X | X |
|   |   | X |   |   | X | X |   | X | X |
|   |   |   |   |   | X | X |   | X | X |

| SF | Bld1 | Bld2 | Bld3 | Bld4 | Bld5 | Bld6 | Bld7 | W1 | W2 |
|---|---|---|---|---|---|---|---|---|---|
| 6 | | | | x | | | | | |
| | | | | | x | X | X | | |
| | | | x | | | X | X | | |
| | | | | | | X | X | | |
| 7 | | | | | | x | X | X | |
| 8 | X | | | | | | x | | X |
| | X | | | | | | | | X |

| Scene Class | Quadrants | | Description |
|---|---|---|---|
| 1 | A | X | No invariances |
| 2 | A | Y | Object invariant |
| 2 | B | Y | |
| 3 | B | Z | Position invariant |
| 3 | B | Z | |
| 4 | B | AA | Multiply invariant |
| 4 | AA | | |

| Scene Class | Quadrants | | Description |
|---|---|---|---|
| 4 | C | AA | Multiple invariant (continued) |
| 4 | D | AA | |
| Non-target | C | X | Object changed with respect to scene class 1 |
| Non-target | B | Y | Position changed with respect to scene class 2 |
| Non-target | C | Z | Object changed with respect to scene class 3 |
| Non-target | D | AA | Object and position changed with respect to scene class 4 |

HIERARCHICAL CLUSTERING METHOD AND APPARATUS FOR A COGNITIVE RECOGNITION SYSTEM BASED ON A COMBINATION OF TEMPORAL AND PREFRONTAL CORTEX MODELS

GOVERNMENT LICENSE RIGHTS

This invention was made with government support under U.S. Government Contract Number D10PC20021 Issued by the U.S. Government. The government has certain rights in the invention.

CROSS-REFERENCE TO RELATED APPLICATIONS

This is a Non-Provisional patent application of U.S. Provisional Application No. 61/780,404, filed in the United States on Mar. 13, 2013, entitled, "Hierarchical Clustering and Method and Apparatus for a Cognitive Recognition System Based on a Combination of Temporal and Prefrontal Cortex Models."

BACKGROUND OF THE INVENTION

(1) Field of Invention

The present invention relates to a cognitive recognition system and, more particularly, to a cognitive recognition system using a combination of temporal and prefrontal cortex models.

(2) Description of Related Art

Local invariant features have been shown to be successful for pattern recognition. Typical models of invariant pattern recognition (see the List of Incorporated Cited Literature References, Literature Reference No. 10) often require many processing layers and, subsequently, many parameters, which often lead to poor generalization performance.

Gentner's structure-mapping engine (SME) analogical reasoner (see Literature Reference No. 11) finds similarities between semantic hierarchies by structural similarity. It is a pattern matcher, and cannot learn new structures. It is the foundation of many analogical reasoners, providing a logical procedure for hypothesizing relationships between the nodes of a target hierarchy and a source hierarchy, and then systematically evaluating relationship strength based on how they match each other.

Hummel and Holyoak's Learning and Inference with Schemas and Analogies (LISA) analogical reasoner (Literature Reference No. 7) is a network pattern-matcher, matching inputs to hand-built ontological descriptions. However, ontology building is difficult, time-consuming, and difficult to automate. Additionally, there is no learning involved. There is a signaling system to find and retrieve relevant stored patterns based on some temporal signals describing features of the input data, but that is impractical for sufficiently complex inputs. Furthermore, there is no way to compare different patterns in parallel or compete them directly. Instead, this must be done sequentially and some metric stored for the comparison.

U.S. Pat. No. 7,599,902, entitled, "Analogical reasoning system" (hereinafter referred to as the '902 patent) describes a high-performance symbolic connectionist model that multiplexes activation across a non-temporal dimension and uses controlled activation flow based on an analogical network structure. The system disclosed in the '902 patent can perform inference based on a hand-designed ontology, but it cannot learn to understand new environments.

U.S. application Ser. No. 13/556,014, entitled, "A Framework for Flexible Cognitive Perception and Action Selection" (hereinafter referred to as the '014 application) describes a bio-inspired method for a robot to learn how to accomplish goals by applying the right actions (including tools) to world situations. The '014 application considered competing hypotheses, but hypotheses were for actions composed of a goal, tools, and situation to be acted on. Additionally, the '014 application emphasized saliency and surprise, reward, and utilities. There was no foveation, and no revisiting of an area using different sensor parameters.

Each of the prior methods described above exhibit limitations. Flat representations and deeply nested knowledge structures alike lead to poor generalization. Thus, a continuing need exists for a method for cognitive recognition that breaks the recognition problem into components for specialized processing and can generalize learned examples of invariant patterns to novel input patterns.

SUMMARY OF THE INVENTION

The present invention relates to cognitive recognition system and, more particularly, to a cognitive recognition system using a combination of temporal and prefrontal cortex models. The system comprises one or more processors and a memory having instructions such that when the instructions are executed, the one or more processors perform multiple operations. The system receives a multi-dimensional scene array as input data. The multi-dimensional scene array is divided into a plurality of sub-arrays with a foveation module which outputs contents of a currently selected sub-array. A hierarchical clustering module clusters the contents of the currently selected sub-array to generate a hierarchical cluster of components from the contents of the currently selected sub-array which are based on the statistical distribution of co-occurrence of features across the selected sub-array. Task-relevant components are selectively gated and robustly maintained into a component memory location of a pattern bank within a working memory module with an input gating module, wherein task-relevancy is determined by reinforcement learning dynamics. Then, for relevant components that activate an abstract category module based on pattern matching between the relevant components and patterns in the pattern bank, a category recognition label is generated for the contents of the currently selected sub-array with an executive control module.

In another aspect, if the plurality of components do not activate the goal category of the abstract category module, then the system selects another sub-array and iterates through the operations until either the abstract category module is activated or all sub-arrays of the multi-dimensional scene array are processed without a pattern match.

In another aspect, if all sub-arrays of the multi-dimensional scene array are processed without a pattern match, then the system detects, with the executive control module, partial pattern matches for the plurality of components in the current sub-array in a pattern storage module and copies each partial pattern match into a separate location in a hypothesis bank within the working memory module.

In another aspect, for each partial pattern match, the executive control module revisits each component of the plurality of components that was not detected and causes the foveation module to search for the component using different sensor parameters.

In another aspect, the hierarchical clustering module decomposes the contents of the currently selected sub-array into components and outputs a spatially invariant hierarchical cluster that is defined by statistical distribution of the features, wherein features that exist in a larger percentage define higher levels in the spatially invariant hierarchical cluster, and wherein components can exist in multiple levels of the spatially invariant hierarchical cluster.

In another aspect, decomposition in the hierarchical clustering module is unsupervised and can be tuned to different levels of decomposition to adapt to various situations.

In another aspect, the input gating module of the working memory module determines task-relevance through reinforcement learning dynamics, and wherein maintenance is robust to delays.

In another aspect, the present invention also comprises a method for causing a processor to perform the operations described herein.

In yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3B is a flow diagram illustrating another alternative aspect of hierarchical processing according to the principles of the present invention;

FIG. 5B is a table including an example dataset according to the principles of the present invention;

FIG. 5C is a table including a continuation of the example dataset in FIG. 4B according to the principles of the present invention;

FIG. 8A is a table of scene categories according to the principles of the present invention;

FIG. 8B is a continuation of the table of scene categories in FIG. 8A according to the principles of the present invention;

DETAILED DESCRIPTION

Figure 1:
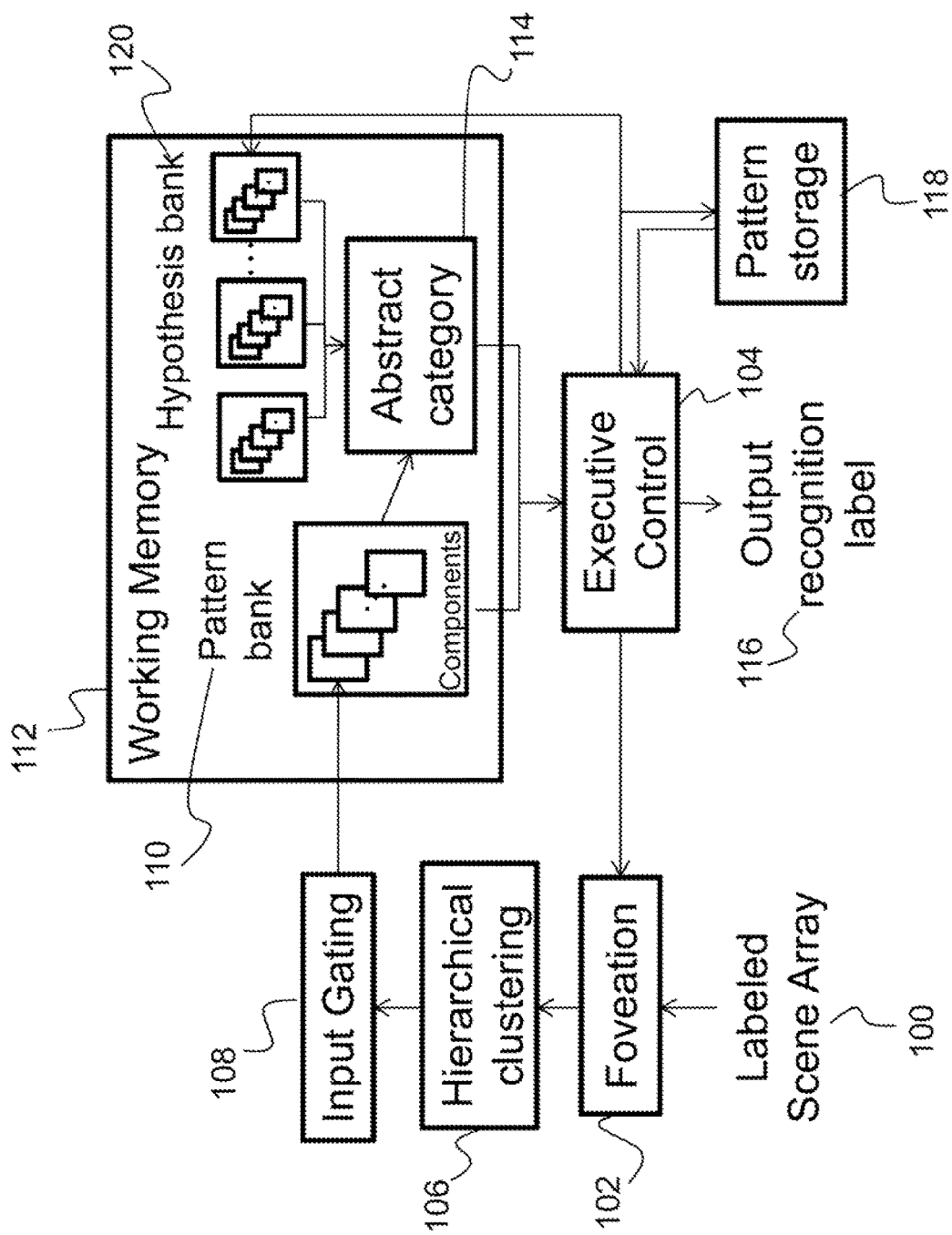
FIG. 1 is a flow diagram illustrating a cognitive recognition system according to the principles of the present invention.

The present invention relates to a cognitive recognition system and, more particularly, to a cognitive recognition system using a combination of temporal and prefrontal cortex models. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Brad Aisa, Brian Mingus, and Randy O'Reilly. The emergent neural modeling system. Neural Networks, 21(8):1146-1152, October 2008.
2. J. Ambros-Ingerson, R. Granger, and G. Lynch. Simulation of paleocortex performs hierarchical clustering. Science, 247:1344-1348, 1990.
3. S. E. Chelian, R. Bhattacharyya, and R. O'Reilly. Learning categories with invariances in a neural network model of prefrontal cortex. In Proceedings of the Second Annual Meeting of the BICA Society (BICA 2011), pages 50-55, Arlington, Va., 2011.
4. J. L. Elman. Finding structure in time. Cognitive Science, 14:179-211, 1990.
5. F. A. Gers, J. Schmidhuber, and F. Cummins. Learning to forget: Continual prediction with lstm. Neural Computation, 12:2451-2471, 2000.
6. S. Hochreiter and J. Schmidhuber. Long short term memory. Neural Computation, 9:1735-1780, 1997.
7. J. E. Hummel and K. J. Holyoak. Distributed representations of structure: A theory of analogical access and mapping. Psychological Review, 104:427-466, 1997.
8. Randall C O'Reilly and Michael J Frank. Making working memory work: A computational model of learning in the prefrontal cortex and basal ganglia. Neural Computation, 18(2):283-328, 12 2006.
9. A. Rodriguez, J. Whitson, and R. Granger. Derivation and analysis of basic computational operations of thalamocortical circuits. Journal of Cognitive Neuroscience, 16:856-877, 2005.
10. Rumelhart, David E.; Hinton, Geoffrey E., Williams, Ronald J. (8 Oct. 1986). Learning representations by back-propagating errors. Nature, 323 (6088): 533-536.
11. Falkenhainer, B, Forbus, K and Gentner, D. The structure-mapping engine: algorithm and examples. Artificial Intelligence, 20(41): 1-63, 1989.
12. O'Reilly, Randall C., and Yuko Munakata. Computational explorations in cognitive neuroscience: Understanding the mind by simulating the brain. Bradford Book, 2000. Chapter 4.
13. W. Maass. On the computational power of winner-take-all. Neural Computation, 12:11, 2000.
14. O'Reilly, Randall C., and Yuko Munakata. Computational explorations in cognitive neuroscience: Understanding the mind by simulating the brain. Bradford Book, 2000. Chapter 3.

(2) Principal Aspects

The present invention has three "principal" aspects. The first is a system for cognitive recognition. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for cognitive recognition. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

Spatiotemporal pattern recognition requires both working memory and categorization. Working memory includes the ability to actively maintain task-relevant information over delays and distracters. Categorization involves grouping perceptually dissimilar objects into functionally organized classes. For purposes of the present invention, "pattern", "category", and "class" are used interchangeably.

Consider the task of scene recognition. Scene recognition requires both working memory and categorization. Saccades (i.e., fast movements of an eye, head, or other part of a body or device) create a series of foveated scene array regions which must be maintained and integrated in a working memory to discern the category of a scene. Such an approach provides invariance over objects or positions as explained below.

The inspiration for the present invention is recognition systems in the mammalian brain. The categorization aspect of scene recognition of individual objects occurs in the posterior cortical area of the brain. The prefrontal cortex (PFC) maintains these objects while saccading (i.e., shifting quickly) to different parts of a scene. One recent neural network model of working memory is the Prefrontal Cortex Basal Ganglia Working Memory (PBWM) model (see Literature Reference No. 8). PBWM working memory has been shown to be more robust and capable of creating more abstract representations than other models of working memory (see Literature Reference Nos. 4, 5, and 6).

The hierarchical clustering model, a recent neural network for pattern recognition (see Literature Reference Nos. 2 and 9), has been shown to not only learn hierarchical groupings but also learn the features that define those groupings. The present invention provides a recognition method specialized for learning and, subsequently, recognizing patterns formed of sub-patterns, where the sub-patterns may themselves have a hierarchical structure. This is achieved by an integration of PBWM with an invariant spatiotemporal pattern recognition module. The networks learn the categories that define these structured patterns by applying training signals upon presentation of examples, but without explicit programming.

(4) Specific Details

The present invention describes a cognitive recognition system using a combination of temporal and prefrontal cortex models. The process of recognition is decomposed to pattern recognition with spatial invariance using learned abstract categories and the patterns to recognize higher level entities. The temporal cortex model of the present invention can recognize patterns with hierarchical structure, extracting the hierarchy as well as labeling the constituent parts into components (a non-limiting geo-spatial intelligence analysis example is described below). The prefrontal cortex model of the present invention uses working memory and reinforcement learning dynamics to create increasingly invariant recognition categories from the components recognized from the temporal cortex model. The invariances relate to spatial invariance and invariance to content, a non-limiting example of which is illustrated in FIG. 4A. Together these constitute the learning of categories that are abstracted from these components. Further, because these components are actively maintained, the system is able to use them to form candidate hypotheses of a higher level identity, and actively search for missing components to satisfy the abstract category.

Temporal cortex models by themselves lack a working memory, which means they cannot retain content over delays or distractors. Prefrontal cortex models, on the other hand, posit a robust input "vocabulary" (i.e., as set of components) upon which they can create invariant recognition categories. In essence, the prefrontal cortex model performs a working memory and mapping function according to the principles of the present invention, learning a grammar using the vocabulary and category ontology provided by the temporal cortex model. This grammar captures spatial relationships between vocabulary components. In addition, some of the vocabulary components can be variable. The prefrontal cortex learns these relationships and forms internal representations for them for subsequent use. Thus, the two models complement each other to form knowledge representations that generalize to new input patterns.

After initial training examples are given, the system can learn to classify these examples as well as generalize to new input patterns. An advantage of the invention described herein is that it breaks the recognition problem into components for specialized processing. These components are learned from examples, not from some pre-designed ontology, so it is well suited for online learning. The system learns to recognize the hierarchical combination of components in an invariant manner at multiple levels. The first level of the system, which performs hierarchical clustering of focus areas of the input, is spatially invariant (i.e., no spatial information) and clusters features to identify a component. The second level of the system, which includes a working memory module and a mapping module, has spatial sensitivity and assembles the recognized components from the first level into a recognized pattern. Either level can include temporal or spatial features, or other dimensions of description. The multilevel recognition aspect makes the system more modular. Some components of a pattern can be interchangeable as well, which makes the system quite flexible and versatile. Lastly, the system uses a common vocabulary (components learned in the first stage) between the levels (modules), which promotes generalization to other problems using the same vocabulary. Each of these aspects will be described in further detail below.

An advantage of breaking down the recognition problem is in scenarios where sensor coverage is limited. The present invention utilizes a working memory to store intermediate results of classification of components. Second, since hierarchical processing is utilized, the system can be configured to provide a coarse, fast, and efficient first pass on input data, followed by a more computationally expensive high-resolution inspection if all components are not found on the first pass: an iterative process of recognition from coarse to fine. Third, the results stored in the working memory can be leveraged for hypothesis testing, and the system can directly search for missing components. Further, candidate hypotheses can be recalled from long term memory.

Provided below is a non-limiting example of how invariances relate to spatial invariance and invariance to content which aligns the abstract terms used above with a specific example. A desired implementation of the present invention addresses a geospatial intelligence (GEOINT) image: a top-down view of buildings and geographic features, such as might be seen from an aircraft. An alternate input could be a map view of such buildings together with descriptive annotations of a political, tactical, cultural, or scientific nature, or the like. In other words, the input is, in general, a multi-dimensional array that could include the two physical dimensions of a geospatial image or map, plus temporal and other more qualitative dimensions, such as color and texture.

The described framework could be extended to behavior recognition where each scene is part of an action sequence (e.g., car left of gate, car at gate, car right of gate to car exit gate). In addition, language processing involves processing chains of symbols at many scales: phonemes in words, words in sentences, sentences in paragraphs, etc. Navigation and motor sequence learning are other examples that could be handled with the present invention.

Any system that must perceive the environment and assess a situation (i.e., make sense of it) can benefit from the present invention. Without learning, a system can only handle situations and data for which it has been designed. Even with standard forms of learning, when a system trained in one domain or context is introduced into a new environment with an unfamiliar domain or context, standard machine learning can adapt parameters but is unable to do radical context shifts.

New environments can be imposed by disasters, which reorganize the landscape in drastic ways. Flexible perception allows a system to recognize situations even when they are slightly different. This makes the system more flexible, robust, and adaptive, and also reduces the programming required. It can give a system a way to find whole new contexts to a situation when old contexts break down or prove ineffective. Any system that acts in a real-world or information-world setting can incorporate the present invention to act in situations where the data is unfamiliar or confusing. For instance, the present invention could be of benefit to any autonomous vehicle, such as a robot or spacecraft.

Spatial and spatiotemporal pattern recognition has applications to active safety, collision avoidance in vehicles, factory safety and automation, and automated driving. Additional non-limiting examples of applications include use in surveillance and unmanned aerial vehicles (UAVs).

(4.1) System Architecture

A diagram of the system architecture of the invention described herein is illustrated in FIG. 1. An input to the system consists of a labeled scene array 100, which is a multi-dimensional array in which each cell contains a label that describes the data in that location in the hyperspace. As a non-limiting example, the input is a two-dimensional (2D) map divided into a high-resolution grid. However, one could envision a three-dimensional (3D) map, or higher dimensions that would further subdivide the data (e.g., by color, texture, etc.). The resolution and dimensionality of the grid is chosen to be appropriate to the application. The guideline to adopt is that the labeled objects that fall in each cell should be smaller than the group of objects that forms an interesting pattern to recognize, so there should be enough sub-components that one group can be distinguished from another.

The following describes the system in context of an input labeled scene array 100 in which only one pattern of interest is expected. However, this approach can be readily adapted to handle many such patterns. As a non-limiting example, the pattern of interest is a "facility" composed of two or more "sub-facilities", where a sub-facility is a collection of buildings or other features. Note that in the most general sense, the constituent parts of a sub-facility could include qualities such as "marshy", or temporally extended events, such as a delivery by truck, a chemical release, or an attack by an insurgent group.

(4.1.2) Foveation

The labeled scene array 100 then undergoes foveation 102, which is a process that involves focusing on a sub-array of the whole input array. Foveation is necessary, as the dimensionality of the input would be very large making the recognition problem much more difficult. The sub-array selected to visit on each iteration could be an arbitrarily complex decision, but it can be done most simply by dividing the array into sub-arrays or "regions", and visiting each in turn in a deterministic scan pattern. Foveation control is provided by an executive control module 104, which is described below. The output of foveation 102 is the contents of a chosen input region (chosen based on a deterministic scan pattern).

(4.1.3) Hierarchical Clustering

The contents of the chosen input region are then clustered with hierarchical clustering 106. Hierarchical clustering 106 could be done by standard techniques, such as divisive or agglomerative clustering. However, in a desired aspect, the present invention adopts a hierarchical clustering method which extracts hierarchical content from data with composite structure, which is described in detail below. The output is a hierarchical set of descriptors of the input data at different levels of detail. The leaves of the output contain the actual labels that were in the chosen input region. Most importantly, the output hierarchy is structured so that the highest level descriptor is a recognized pattern, or component, describing all the constituent parts. In the parlance of the GEOINT (geospatial intelligence) example mentioned above, this is a "sub-facility".

Hierarchical content is defined by the statistical distribution of features within data with composite structure, where a component is an aspect of the data with composite structure. Features that exist in a larger percentage of the data define higher levels in the hierarchy. The data is represented by vectors, and the features are represented either by dimensions within the vector or linear combinations of the dimensions. The features may be discrete, binary, or continuous (typically real values between zero and one or between minus one and one). Thus, unlike traditional methods that recursively decompose elements of a dataset into different subgroupings, in the hierarchical clustering method of the present invention, data elements can exist in multiple groups, representing different aspects of that element.

Traditional hierarchical clustering methods only extract the "shape" of the tree (or dendrogram). In other words, previous methods only provide the groupings (and groupings of groupings) of the composite objects. The hierarchical clustering method of the present invention leverages the learning capability of neural networks to extract the features that go into composing or defining the objects and groupings. This provides definitions of the groupings based on content instead of distance between members of the groups. It allows the groups to be decomposed into features. Those features that are common to more members define groups higher up in the hierarchy. As described above, images must be preprocessed to identify components in terms of shape, orientation, and location (i.e., the labeled scene array depicted as element 100 in FIG. 1). Then, the method according to the principles of the present invention can recognize groups of features that compose objects.

The hierarchical clustering method of the present invention allows a hierarchical decomposition of perceived objects into features. Decomposition into features will facilitate understanding. The decomposition is unsupervised and derived from the natural statistics of the environment. The system can be tuned to different levels of decomposition to be adaptive to different situations, such as the time for perception and the level of decomposition. If a quick system response is necessary, the system can decompose the input into only the coarse higher level features. If more time is available, the system can iterate extracting finer more detailed levels of structure. This is ideal in environments where an exploration versus exploitation trade-off is often required. The hierarchical classification into elements can assist a system to extract an ontology of its sensory realm.

Figure 2:
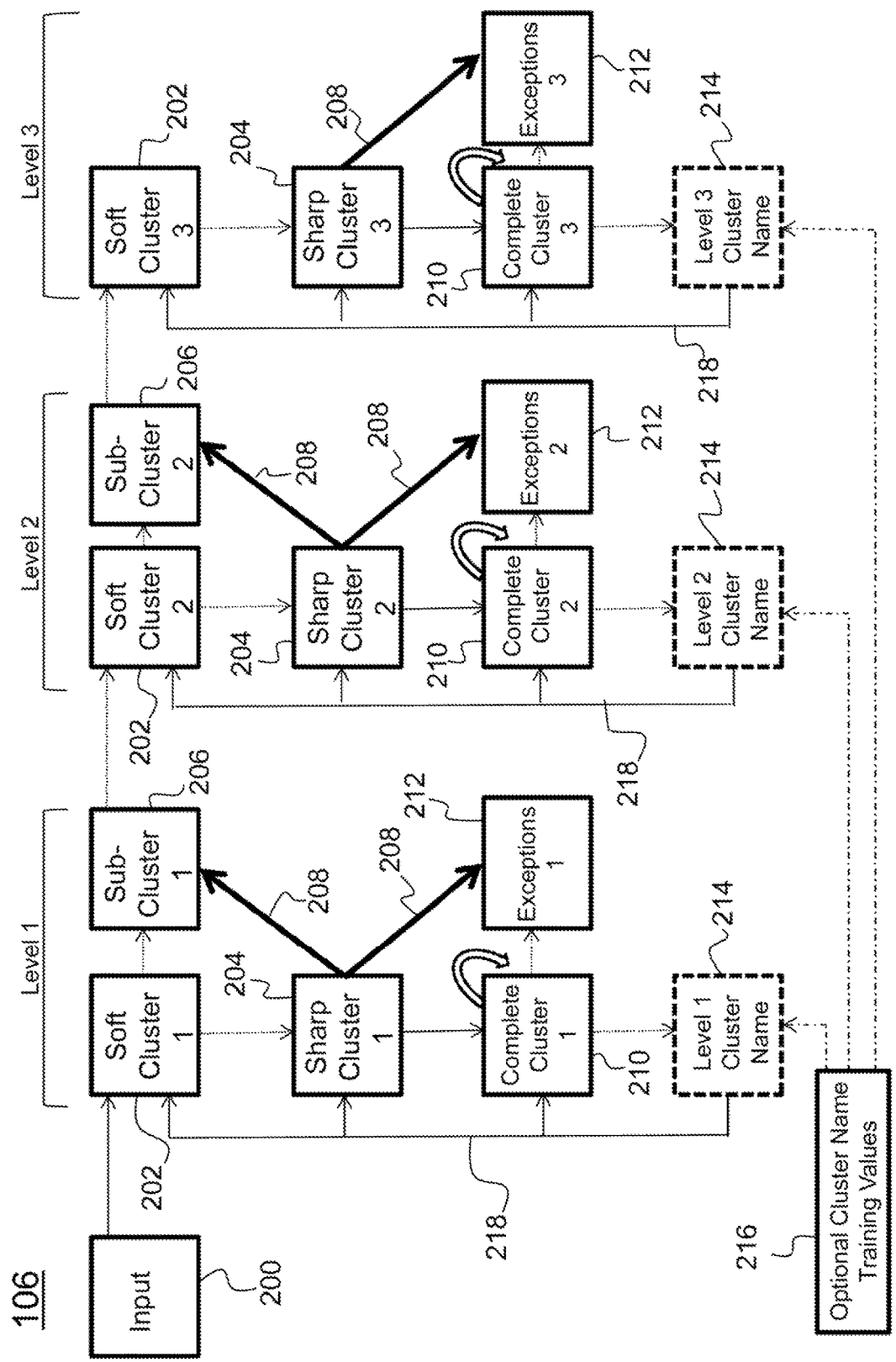
FIG. 2 illustrates a network with hierarchical processing according to the principles of the present invention.

FIG. 2 is a block diagram representing an implementation of the hierarchy clustering 106 method shown as a neural implementation; however, other implementations are possible. In the aspect shown in FIG. 2, the system comprises layers of neural units having weighted connections. The aspect principally learns features by adapting weights. The principal method of adaptation is to increase the weight for a connection between two units that are active, and decrease them when only one is active, such as through Hebbian learning (see Literature Reference No. 12). Since the neural units represent the input feature space, the strengths of the weights correlate to the statistics (or frequency) of the input features at the top level in the hierarchy. In this aspect, weights can be positive (excitatory), negative (inhibitory), or zero.

The aggregate activity of neural units within a layer can be controlled by inhibition between units in that layer as well, such as through k-winner-take-all (kWTA) inhibition (see Literature Reference Nos. 13 and 14), where k is the number of units allowed to reach threshold by titrating the inhibition. The activity within a layer can mediate the competition between the learning and subsequent activation of units. This is important because the unit activations within layers of the system architecture undergo such a competitive process and form the underlying representations, which eventually becoming strengthened through repeated coactivation and Hebbian learning of the weights. Since these representations are grounded in the input feature space (so the meaning of unit "N" is the same from layer to layer), controlling the amount of competition (i.e., the k in kWTA) essentially controls which features get represented based on their strength (i.e., only the strongest k units will surpass inhibition). Different levels of inhibition are utilized in the architecture for this purpose, so that features are learned at each subsequent level of the hierarchy according to their strength. Many embodiments of neural units (e.g., their activation functions), learning algorithms, and other aspects of neural architecture exist, and this method is not dependent on any single one.

Referring to FIG. 2, input data 200 is fed into a Hebbian-based soft cluster layer 202 topographically. The Hebbian learning rule will increase the strength of the weights to those cells corresponding to commonly occurring inputs.

The soft cluster layer 202 will have a relatively promiscuous kWTA setting (low inhibition) and also feed topographically into another layer with a sharper, narrower response (i.e., more inhibition) which creates a sharp-cluster representation of the input clusters, or a sharp cluster layer 204. Both the soft cluster layer 202 and the sharp cluster layer 204 feed into a sub-cluster layer 206 where the sharp cluster outputs of the sharp cluster layer 204 inhibit 208 (inhibition represented by a bold arrow) the soft cluster outputs of the soft cluster layer 202 leaving only those features which are not as strong (i.e., not as commonly occurring). This output becomes the input for the next level of clustering.

The first level (level 1) processes parts of the input that occur frequently in the input data 200, then removes them leaving the less common parts to be processed in level 2, and so forth. The sharp cluster layer 204 also feeds into a complete cluster layer 210 which also has recurrence. The recurrence enables the layer to pattern complete. Cells which usually fire (or are active) with other cells, but are not in the input data 200, will fire in the complete cluster layer 210. Both the complete cluster layer 210 and the sharp cluster layer 204 connect with the exceptions layer 212 where the sharp cluster outputs of the sharp cluster layer 204 inhibit 208 the complete cluster outputs of the complete cluster layer 210, leaving only those usually co-occurring outputs that are missing in the input data 200.

As an example, assume that the input set contains samples of birds. Cells representing "warm-blooded", "flies", "has feathers", and "has beak" will be re-enforced to fire. If a sample representing a penguin is received, all of the aforementioned cells except "flies" will fire in the sharp cluster layer 204. Because of its recurrency, the complete cluster layer 210 will cause the "flies" cell to also fire, since the Hebbian learning will re-enforce the co-firing (co-occurrence of activity) of these cells. The sharp cluster layer 204 will inhibit 208 all of the present common features (e.g., "warm-blooded", "has feathers", "has wings") leaving only the "flies" feature. The exceptions layer 212 will signal all the missing common features. For instance, penguins are birds (the cluster) that do not fly (the exception).

Additionally, the network supports two options. First, a cluster name layer 214 can be added to assign an arbitrary name to the cluster. As an example, this layer can use a localist representation where each cell represents a different class of vertebrate. The cluster name layer 214 is supervised and trained with the cluster name with cluster name training values 216. In this case, the bird cell will be on (or be active) for all samples of birds input, and the network will not only learn the features of birds but will identify this category by "name". Second, in addition to naming clusters, the cluster name layer 214 can provide complete Hebbian feedback 218 to the soft cluster layer 202, the sharp cluster layer 204, and the complete cluster layer 210 to enforce supervision on the clustering. This allows finer distinctions between categories to be made based on training samples then can be learned unsupervised just by using the naturally occurring statistics.

FIG. 2 illustrates the architecture chained with each clustering level being performed by an explicit circuit. It is also possible to implement the circuit iteratively where the output of the sub-cluster layer 206 feeds back into the input data 200 layer (not shown). This allows the network to be built with fewer layers; however, the network takes longer to learn and may not have the same capacity since the same set of layers must learn representations for all levels of the hierarchy. This allows clustering to an arbitrary level, terminating only when the signal has been completely inhibited.

Furthermore, FIG. 2 details how category labels at each level of hierarchy can be fed to the system during supervised training. This training allows the systems to subsequently produce a category label from new data, which can in turn be used to constrain processing in other layers of the architecture (e.g., with learning in connections from level 1: level 1 cluster name layer 214 to soft cluster 1 202, sharp cluster 1 204, and complete cluster 1 layer 210).

Figure 3A:
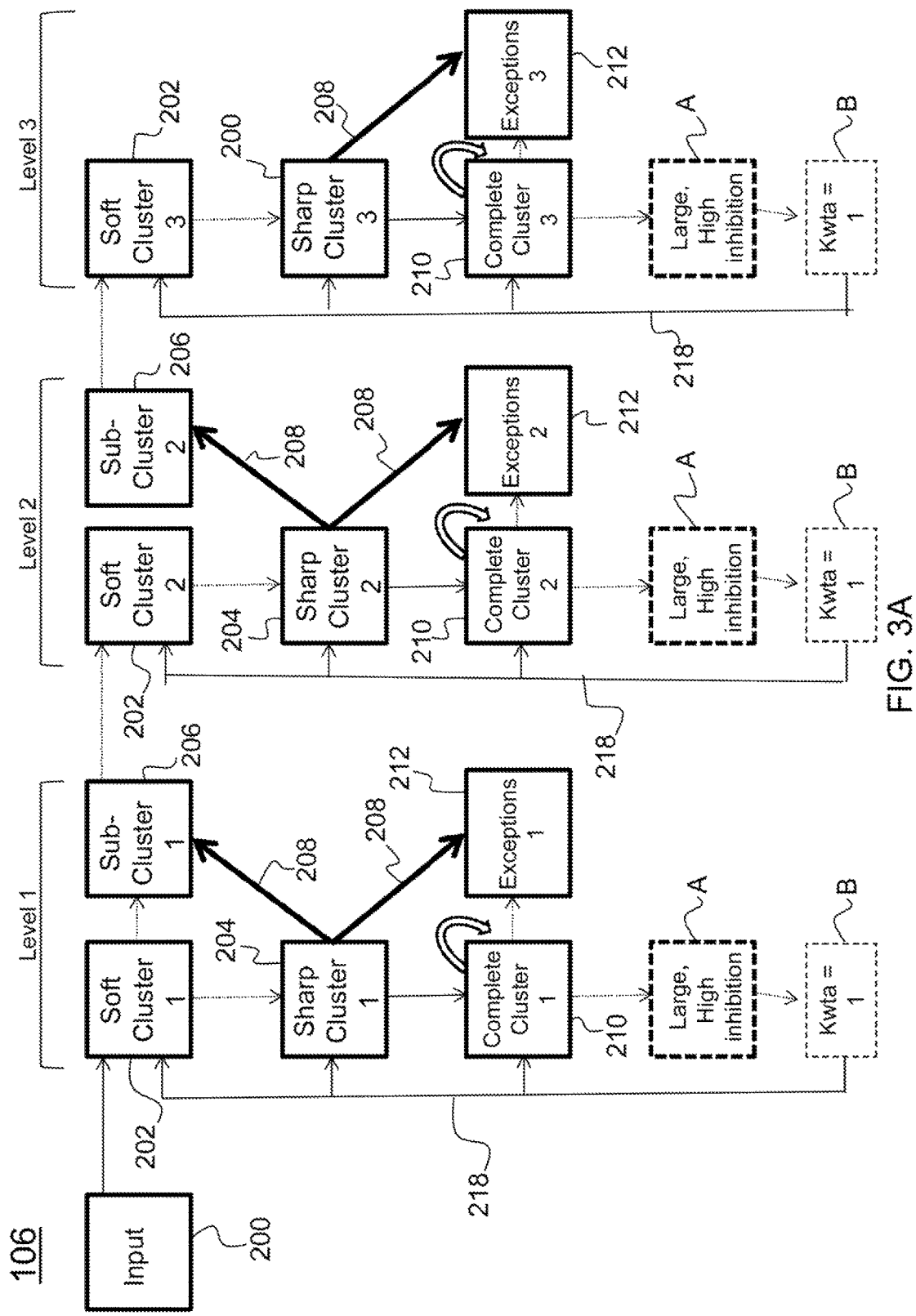
FIG. 3A is a flow diagram illustrating an alternative aspect of hierarchical processing according to the principles of the present invention.

Category labels may not be available during training. The system still learns the statistics of the input data to learn categories and form input feature based representations of them. These representations themselves serve as categories. Further, additional architectural elements can be added by one skilled in the art to create other representations useful as category labels. One non-limiting example is to add two layers (e.g., A and B) to the system for each level that are serially connected in a feed-forward manner to the complete cluster layer 210, as depicted in FIG. 3A. If layer A is large, has random weights from the complete cluster layer 210, and has high inhibition 208, it will form well separated and sparse representations of the complete cluster layer 210. In turn, if layer B, which contains as many units as there are categories for the level, receives input from layer A with kwta=1 inhibition (only one unit can be active), it will form a localist representation of categories. Note that learning category labels will perform best once learning for the complete cluster layer 210 has converged, since it then represents the strongest occurring features as extracted by the sharp cluster 1 layer 204. FIG. 3A shows this alternative circuit. A layer is represented by a box, whereas a level represents a level of processing and is comprised of a number of layers indicated under the title Level 1, Level 2, and Level 3 in the figure.

Additionally, the system can include a control circuit to turn the activity on and off at different hierarchical levels. This may be advantageous because the stability of the representations increases with the number of training examples. Thus, a first iteration through the input data 200 will cement the most common features in Level 1. Otherwise, learning in Level 2 and beyond may oscillate due to changes in representations from Level 1 as new input statistics are learned. The form of this control circuit can be simply programmatic, or can actively control the learning rates in subsequent levels in a graded fashion. Moreover, the control need not be dependent on iterations through training examples, but statistics derived from the network itself, such as the magnitude of weight changes over time (indicating a convergence), or performance metrics from classification.

Since the architecture utilizes inhibition from one hierarchical level to the next (M to M+1), the level of activity in the soft cluster M+1 layers 202 decreases. This subtraction will ultimately lead to no activity at level N when the features have been fully extracted by previous levels N−1, N−2..., etc. Detecting this will allow the level of hierarchy to be determined.

The network in FIG. 2 shows the invention where each level of the hierarchy is processed by its own section of the network. It is also possible to implement the circuit in a temporal hierarchical processing loop. In this configuration the sub-cluster layer 206 feeds back into the soft cluster layer 202. This form uses less circuitry but requires more complex control. The input data needs to be shunted during the iterative processing, and the feedback needs to be delayed long enough to allow the rest of the network to settle and read out before the next round of hierarchy is processed. In the loop configuration depicted in FIG. 3B, the successive layers of the hierarchy are available in temporal succession.

The processing loop 300 can be terminated when the downstream network indicates it has received enough detail for its application. In the loop configuration, instead of each level of processing having its own circuit the same circuit is used for each level of processing by feeding the output back into the input. Each iteration of the loop 300 gives finer detail. The output from the sub-cluster layer 206 will diminish in each iteration, retaining only the finer less common elements of the data. A particular application can stop this iterative process when it has received enough detail and does not need these less common elements.

(4.1.4) Input Gating

Referring again to FIG. 1, input gating 108 puts the current hierarchical cluster, or component or sub-facility, from hierarchical clustering 106 into one of the component memory locations in a pattern bank 110 of a working memory module 112. Most simply, it gates it into a component memory location that matches the region it was encountered in, where there are enough component memory locations to allow a 1-to-1 mapping to regions. Input gating 108 is trained to only gate in hierarchical cluster types of interest, so one can avoid gating anything that is distracting.

If there are enough components of an abstract category after hierarchical clustering to activate an abstract category 114, then the executive control module 104 outputs, through an output recognition label module 116, the category and each component of the category, and the goal is achieved. If, however, some components of the goal category have not been located, the executive control module 104 tells foveation 102 to move to the next region, and the steps that occur in foveation 102, hierarchical clustering 106, input gating 108, pattern bank 110, abstract category 114, and the executive control module 104 are iterated until either an abstract category 114 is activated or all regions are processed without a match.

If all regions of the input (i.e., labeled scene array 100) have been processed without an exact match, then executive control 104 looks into pattern storage 118 and finds all partial matches, copying each into a separate location in a hypothesis bank 120. A hypothesis bank 120 has storage for multiple components of each pattern and a boolean related to each component that indicates whether a matching component is in the current pattern bank or not. A component in the hypothesis bank 120, like in pattern storage 118, includes not only the component pattern, but also information on the most restrictive sensor parameters that have been required in the past to find such a component, as well as a measure of distance at which this component was found with respect to every other component in the pattern. These parameters and measures are supplied to foveation 102 if a component has not been found, and a further search must be conducted.

(4.1.5) Executive Control

Figure 4:
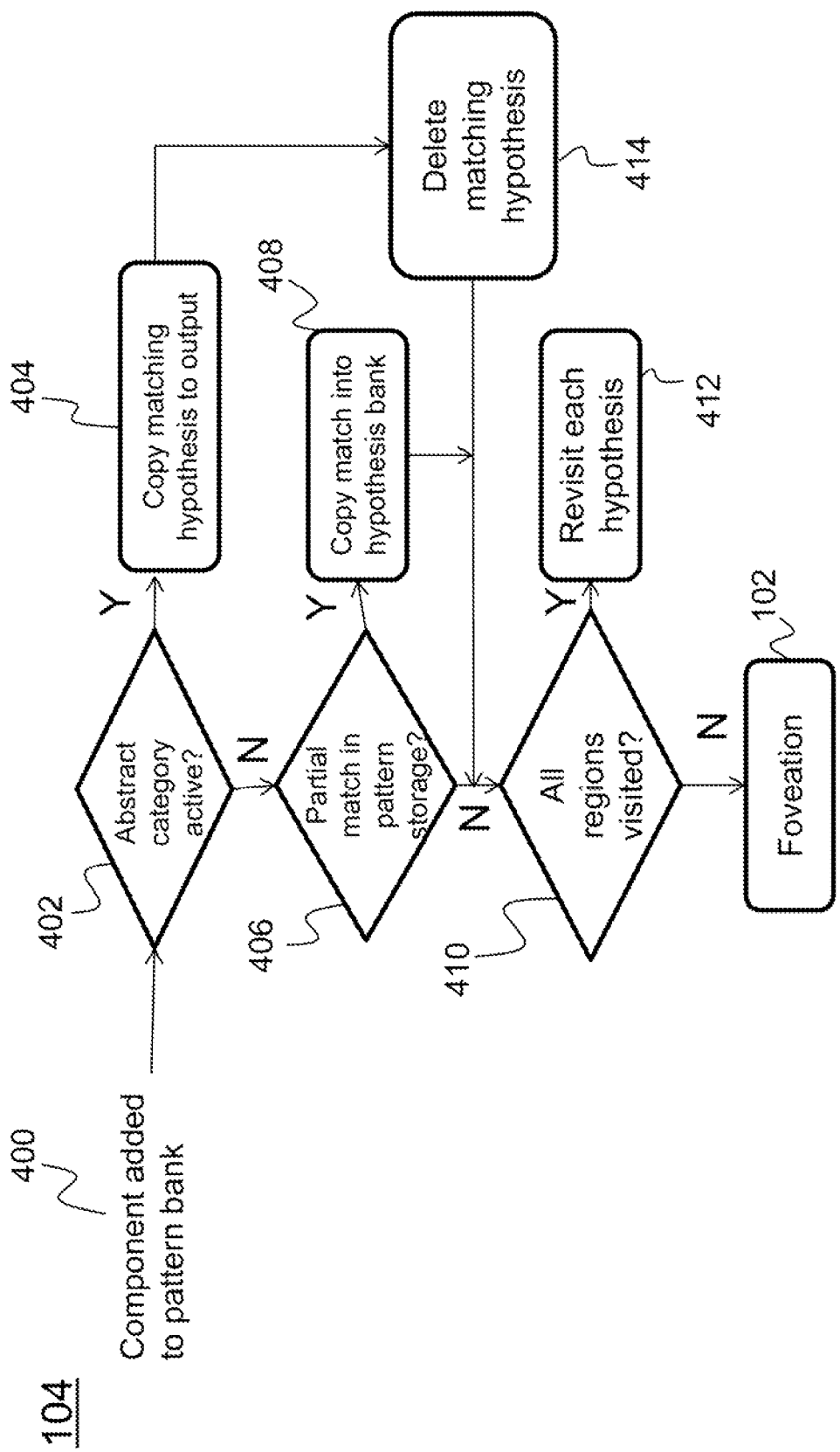
FIG. 4 is a flow diagram illustrating the executive control process according to the principles of the present invention.

FIG. 4 is a high level flow diagram of the process for the executive control module 104. When a component is added to the pattern bank 400, an assessment is made by the hypothesis bank with regards to whether it activates an abstract category (Abstract category active? 402). The pattern bank matches input components added to the pattern bank 400 with the contents of the hypothesis bank. If yes, then the matching hypothesis is copied to the output 404. If not, then an assessment is made with regards to whether a partial match exists in pattern storage 406. If a partial match exists, then the match is copied into the hypothesis bank 408. If there is not a partial match in pattern storage, then the executive control module revisits each component that was not detected (All regions visited? 410), and causes foveation 102 to search for it, possibly with a more intensive search (e.g., higher power, higher resolution, alternative filters). If the hypothesis included an expected area relative to the other components, then the process starts there and traverses nearby regions as well. If all regions have been visited, then the system revisits each hypothesis 412. Any hypothesis that is left at this point has not been matched with a pattern in the pattern bank. For each one, the executive control should either (A) store this as a new pattern in the pattern storage, or (B) search further for any components of the hypothesis that have not been located in the input data. For B, that means considering each unlocated component in turn, signaling the foveation 102 to search for it using parameters and distance criteria that were stored with the hypothesis.

The executive control module can be supplied with some criterion for saving a pattern to pattern storage. This can be as simple as a signal from a user (i.e., supervised learning) that this should be saved, or more complicated by supplying an evaluation method and a metric that would decide when a pattern should be saved (i.e., unsupervised learning). As described above, when a new pattern is stored, information is supplied along with each component of the pattern, giving sensor parameters and relative distances.

Referring to FIG. 4, after an exact match, the matching hypothesis is deleted (delete matching hypothesis 414), along with any components in the pattern bank that are not involved in any other hypotheses. When copying a partial match into the hypothesis bank (copy match into hypothesis bank 408), if it is already there, the system should not add a new one.

The system described above can find one hierarchical pattern in an input array, but the basic idea can be extended to handle multiple patterns in a single input array. One skilled in the art can readily train the system to accomplish such a task, as will be described below.

(4.2) Method

As stated above, the present invention is a combination of hierarchical clustering and abstract category learning modules. These modules, followed by their integration, are described in detail below.

(4.2.1) Hierarchical Clustering

The preferred implementation for hierarchical clustering of regions of the input data is described above. It emulates human categorical perception in that it recognizes objects first at categorical levels and, subsequently, at successively subordinate levels suggesting the presence of structured memories that are organized and searched hierarchically during recognition.

Referring again to FIG. 1, the hierarchical clustering 106 module takes in low level features of a region that the foveation 102 module has focused on. Hebbian learning creates hierarchical groupings of features that discriminate the various sequence elements and the groups of features that define the various layers of the hierarchy. These "labels" (identifying the clusters and sub-clusters) or sequence elements are output to the input gating 108 mechanism which then feed into the abstract category 114 learning module of the working memory module 112 which includes the pattern bank 110.

(4.2.2) Abstract Category Learning

In a non-limiting example, abstract category (FIG. 1, element 114) learning starts with the prefrontal cortex (PFC) model of O'Reilly and Frank (see Literature Reference No. 9). As can be appreciated by one skilled in the art, several other embodiments are also possible so long as they are able to selectively maintain task relevant sequence components and classify sequences.

The model used in the present invention, known as prefrontal cortex basal ganglia working memory (PBWM), learns which sequence components are task relevant, when to "dynamically gate" them in and out, and which classification labels, based on the contents of working memory and current input, elicit reward or are a correct classification or not. This model implements the input gating module (FIG. 1, element 108) and pattern bank (FIG. 1, element 110). Input gating preference for relevant components is done by training the weights of the basal ganglia (BG) model to: learn the relevance of a sequence component (does holding onto it lead to reward (i.e., a correct classification)?), rapidly add or remove sequence components from "stripes" (or pattern components) in the working memory module (FIG. 1, element 112), and determine whether classification labels are correct or not.

(4.2.3) Integration

The system architecture diagram (FIG. 1) for the preferred implementation illustrates the parts of the inventive system specialized to a GEOINT problem. In this case, components correspond to "subfacilities" as recognized in particular regions of the data by the hierarchical clustering (FIG. 1, element 106). A sequence of foveations (FIG. 1, element 102) creates a sequence of subfacilities, which then define a facility. The facility types, or categories, are what the system seeks to learn. However, the present invention is also extensible to other spatiotemporal pattern recognition tasks.

Referring again to FIG. 1, a labeled, but uncategorized, input scene is transformed into a labeled scene array 100. Labeling here refers to identifying constitute components, such as house, silo, warehouse, but not the overall output recognition 116 or facility ID (e.g., training camp, industrial complex). Parts of the labeled scene array 100 are then visited in some order by the foveation 102 module, most simply by fixed scan paths (e.g., left to right, top to bottom), although more data-driven schemes could be devised, such as salience driven saccades. Foveated scene features are hierarchically clustered with spatial invariance. That is, the hierarchical clustering 106 module creates a spatially invariant representation of sequence components, or subfacilities. Through a process of reward learning in the input gating 108 module, subfacilities that are deemed task relevant are gated into working memory module 112, while those that are not task relevant are ignored. Within the working memory module 112, subfacilities occupy slots within the pattern bank 110. These sequences of subfacilities activate hypotheses. A hypothesis is a pattern retrieved from pattern storage 118 by the executive control 104 into a part of the working memory module 112 that is similar to the pattern bank 110, but includes some parameters and distances as described above.

Figure 5A:
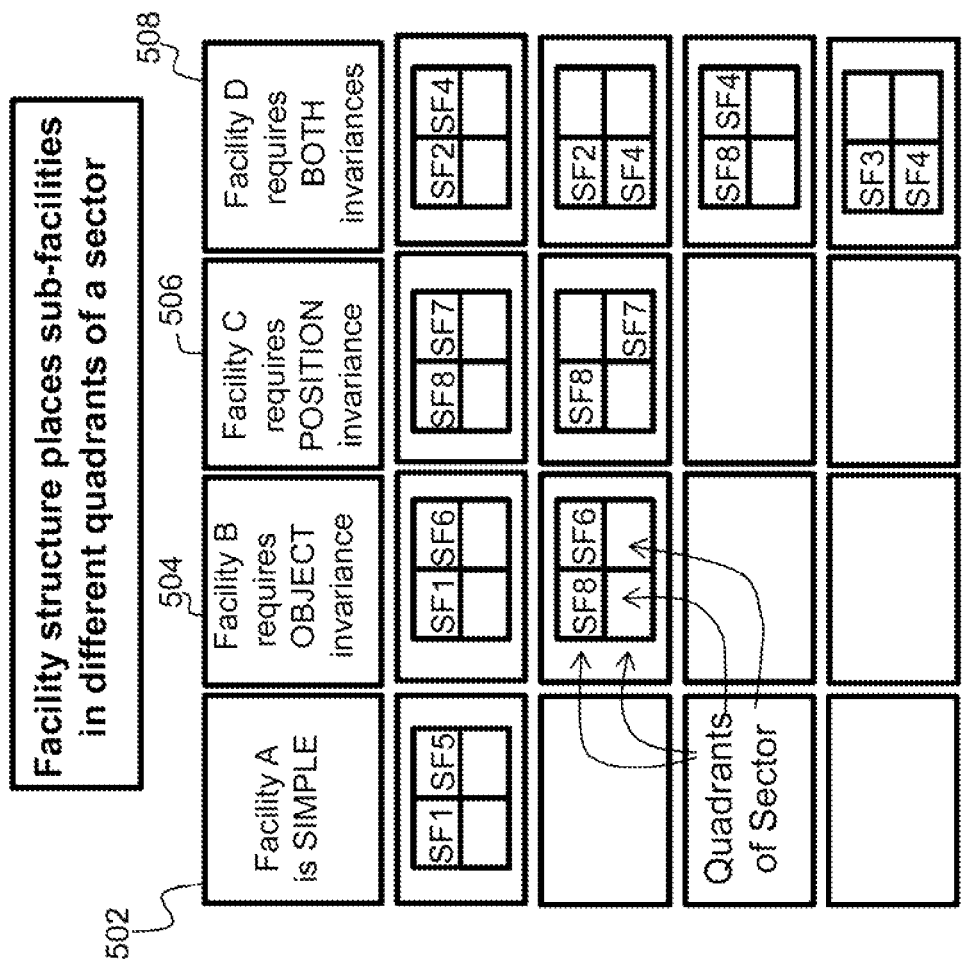
FIG. 5A illustrates facility and sub-facility arrangement according to the principles of the present invention.
Figure 6:
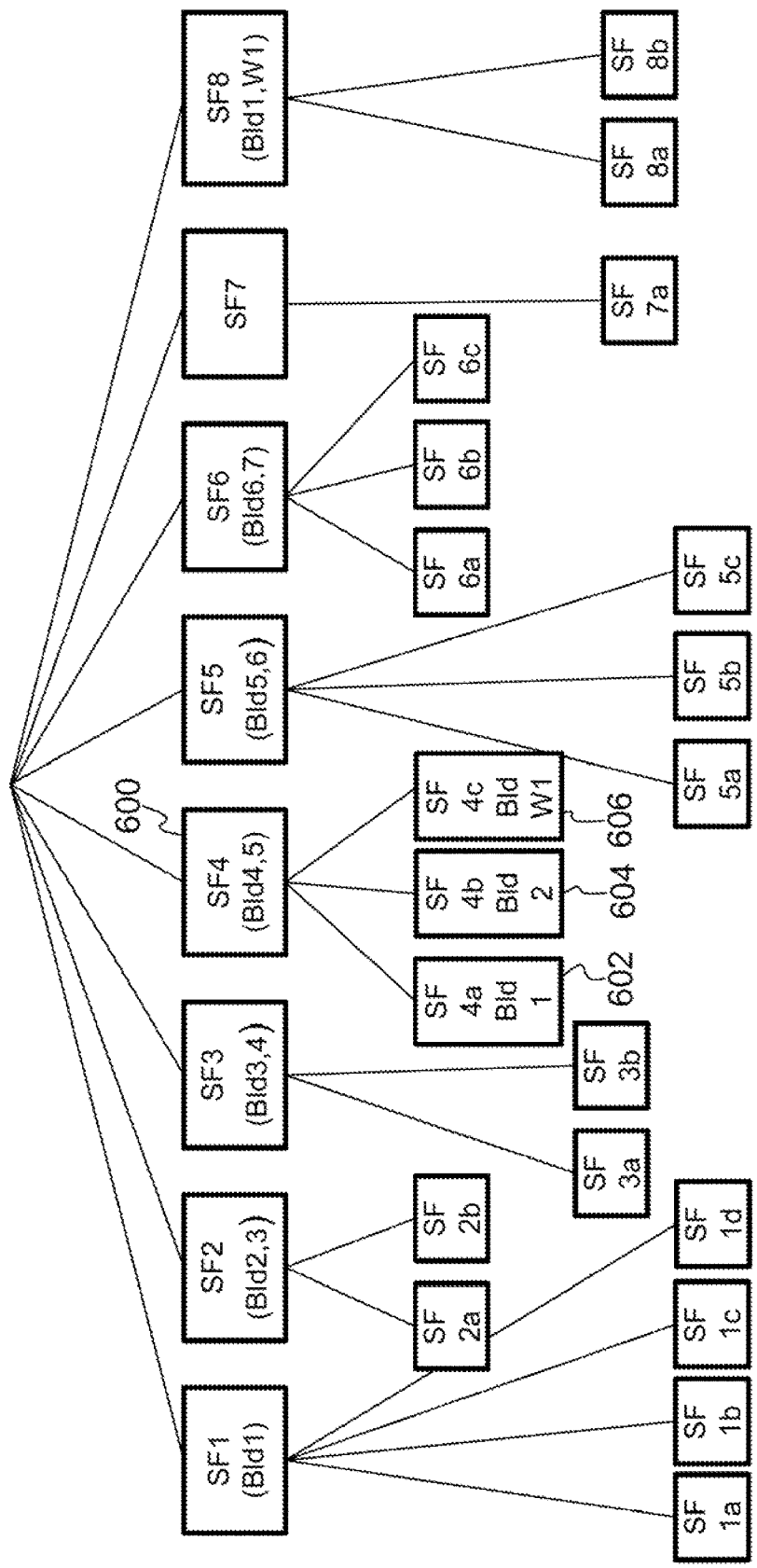
FIG. 6 illustrates a hierarchical data structure within the example dataset of FIGS. 4B and 4C according to the principles of the present invention.

FIGS. 5A-5C illustrate an example input used in experimental studies of the present invention. The hierarchical clustering model (element 106) has to learn eight different types (labeled 1-8 in the table 500 shown in FIGS. 5B and 5C) of sub-facilities (SF). Each of these is defined probabilistically where the components can have a high, medium, or low probability of being a member of the sub-facility, which are marked by an X, x, or blank, respectively. Each type of sub-facility has different variants defining a two level hierarchy of sub-facility types, as illustrated in FIG. 6. As an example, sub-facility 4 (SF4) 600 has three variants 602, 604, and 606. They all have building 4 and 5 in common. The hierarchical clustering model learns that these buildings define SF4 600. It also learns that Bld1, Bld2, and W1 are what distinguish the sub types (SF 4a 602, SF 4b 604, and SF 4c 606, respectively). Since all three define versions of SF4 600, it can be hypothesized that Bld1, Bld2, and W1 may serve equivalent functions.

As shown in FIG. 5A, subfacility 1 (SF1) activates hypotheses for Facility A 502 and for Facility B 504, as indicated by the presence of SF1 in the respective columns. The pattern bank (FIG. 1, element 110) might contain components of several patterns, and each of those candidate patterns will be instantiated as hypotheses. For concreteness, SF1 in quadrant 1 and subfacility 5 (SF5) in quadrant 2 are recognized as Facility A 502, as shown in FIG. 5A. Using a left to right, top to bottom foveation scheme, quadrant 1 is the northwest most region; 2, northeast; 3, southwest; 4, southeast. "Facility A is SIMPLE" refers to the fact that its definition is simple, it is defined by sub-facility 1 in the upper left quad and sub-facility 5 in the upper right quadrant. "Facility B requires OBJECT variance" refers to the fact that Facility B shows object invariance meaning that it is still Facility B across some different two different sub-facilities (i.e., sub-facility 1 or sub-facility 8 in quadrant 1). Facility C 506 holds under different positioning of sub-facilities; hence, "Facility C requires POSITION invariance". Facility D 508 requires both object and position invariance. The system can recognize composite entities (e.g., categories, facilities) that are simply defined by a set of objects (e.g., components, sub-facilities) in fixed relative positions as well as entities that are defined by different components. In this non-limiting example, a facility needs delivery of materials, which can be either a railroad line or a river for transportation, so it still is the same facility even though it is comprised of some different components.

Successfully recognized facilities activate the abstract category (FIG. 1, element 114) module in the working memory (FIG. 1, element 112), which causes executive control (FIG. 1, element 104) to output them. Hypotheses can also modify foveation 102 through executive control 104, as depicted in FIG. 1. For concreteness, if SF1 is recognized in quadrant 1, hypotheses for Facility A (FIG. 5A, element 502) and Facility B (FIG. 5A, element 504) will "look for" subfacilities in quadrant 2—there is no need to consider quadrants 3 or 4.

Figure 7A:
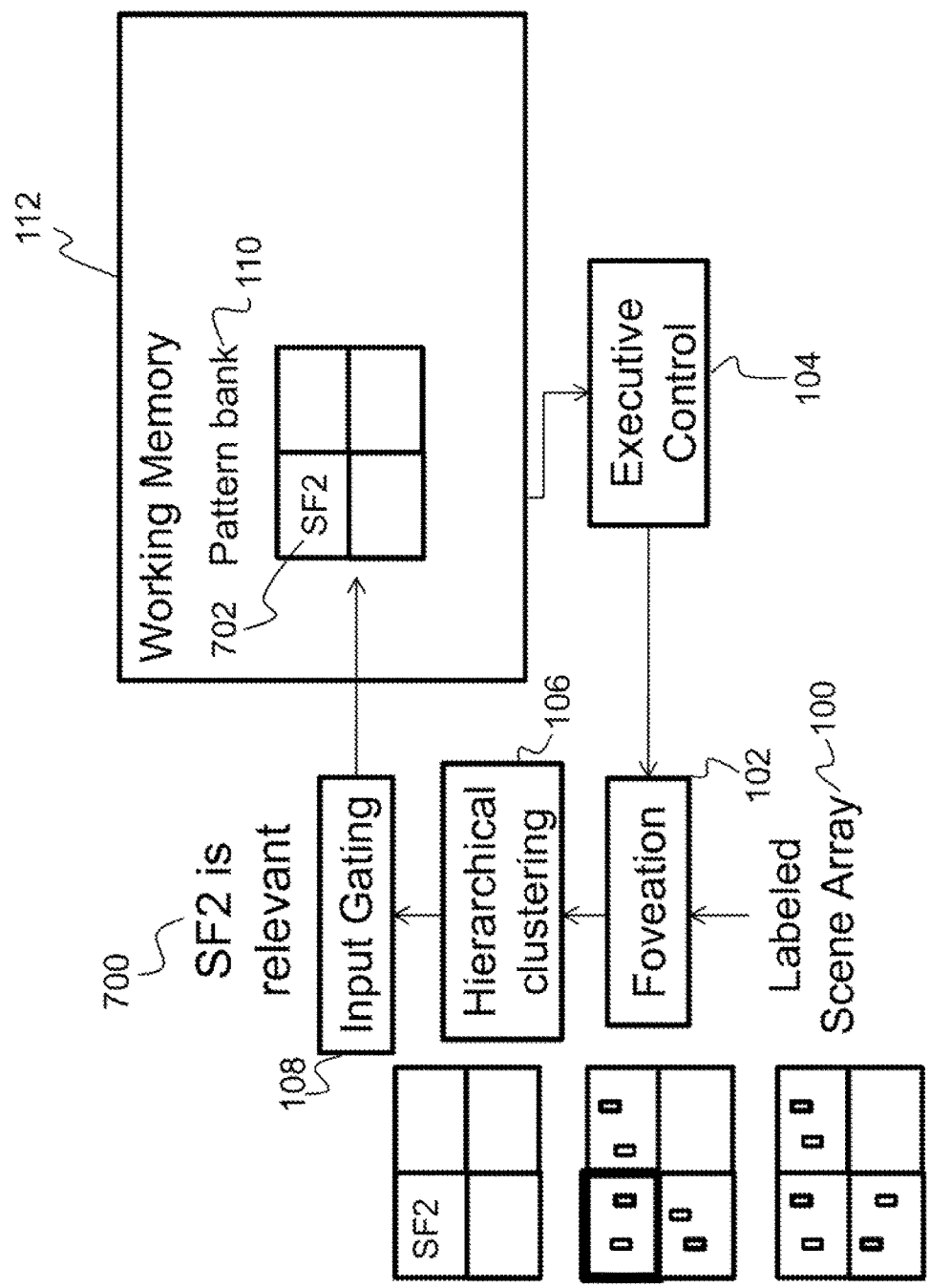
FIG. 7A illustrates an example of recognition of a facility using sub-facility 2 from the example dataset of FIGS. 5B and 5C according to the principles of the present invention.
Figure 7B:
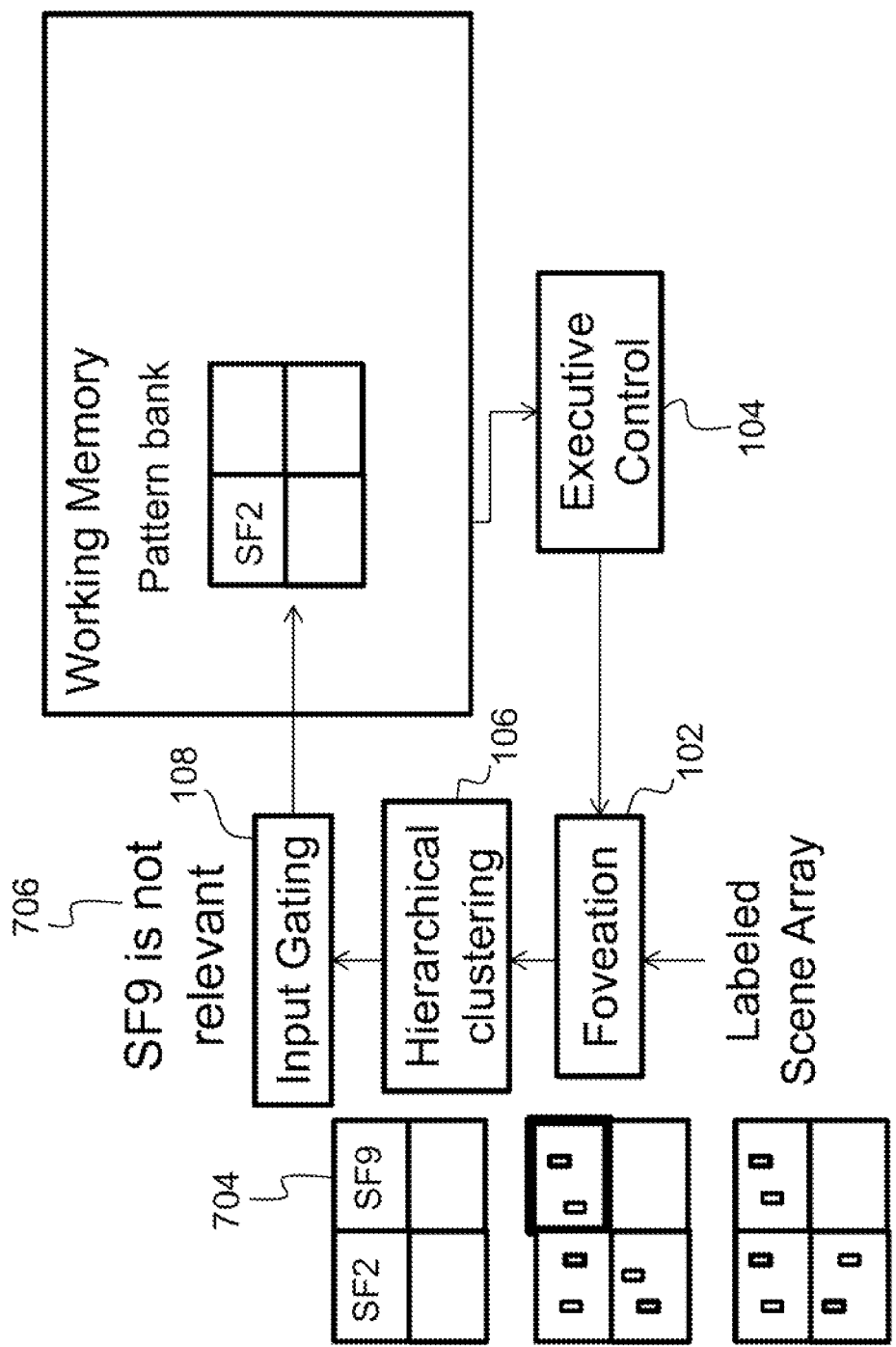
FIG. 7B illustrates an example of recognition of a facility using sub-facility 9 from the example dataset of FIGS. 5B and 5C according to the principles of the present invention.
Figure 7C:
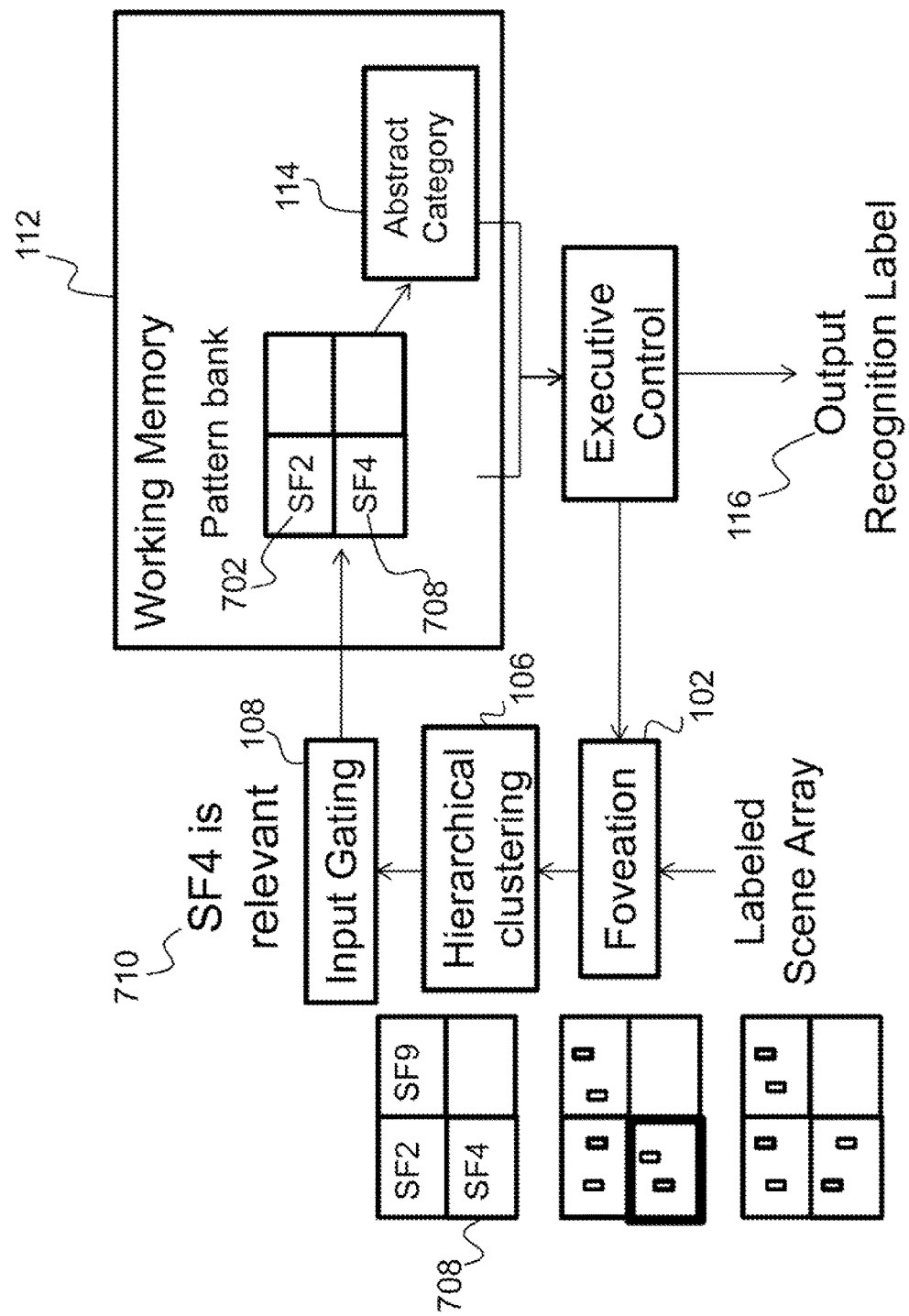
FIG. 7C illustrates an example of recognition of a facility using sub-facility 4 from the example dataset of FIGS. 5B and 5C according to the principles of the present invention.

For further clarity, an example of recognition of (one type of) Facility D 508 from the example dataset in FIGS. 5B and 5C by the present invention is depicted in FIGS. 7A-7C. Referring to FIG. 7A, the labeled scene array undergoes foveation 102, as guided by executive control 104, which chooses the first quadrant. The hierarchical clustering 106 module than labels this set of features as subfacility 2 (SF2). Through repeated experience (i.e., reward learning dynamics), input gating 108 determines that SF2 is relevant 700 to the task of recognizing facilities. Because it is relevant, SF2 702 is stored in the pattern bank 110 of the working memory module 112. In this non-limiting example, the working memory module 112 is topographic, although this is not a requirement for the present invention. Within the working memory module 112, SF2 702 alone does not compromise a facility so no output recognition label is produced. However, SF2 can be a cue for SF4, so executive control 104 can adjust sensing parameters on subsequent saccades to look for SF4.

Referring to FIG. 7B, executive control 104 has foveated 102 onto the next image quadrant. The hierarchical clustering 106 module recognizes this as SF9 704, a subfacility not used by any of the facilities defined in the example dataset in FIGS. 5B-5C. Thus, input gating 108 ignores this quadrant and does not allow it to proceed into the working memory module 112, as it is determined that SF9 is not relevant 706. Again, no output recognition label is produced.

Finally in FIG. 7C, the third quadrant is foveated 102 and labeled as SF4 708 by the hierarchical clustering 106 module. Input gating 108 deems SF4 as being relevant 710, and it is stored in the working memory module 112. At this point, an abstract category 114 of SF2 704 in quadrant 1 and SF4 708 in quadrant 3 is recognized as a (type of) facility D, and an output recognition label 116 is produced.

(4.3) Experimental Studies

Abstract category learning is described in Literature Reference No. 3. Below are further details regarding information flow in the present invention and a summary of results from experimental studies. PBWM, a model of parts of the mammalian brain, is part of the preferred implementation as mentioned above. It includes a prefrontal cortex model (PFC), which implements the working memory (element 112) and the pattern bank (element 110), and a basal ganglia (BG) model, which implements the input gating module (element 108). A PFC stripe is the desired implementation of the components of the pattern bank (element 110), and other mechanisms in the PFC implement executive control (element 104).

To illustrate the information flow within PBWM, consider the 1-2-AX task. In this task, input patterns such as the numbers 1 and 2, and the letters A, B, C, X, Y, Z are presented sequentially. A non-limiting example input sequence might be: 1ABX3CD2BYZ. An input of 1 means look for A followed by X, while an input of 2 means look for B followed by Y. Thus, the number defines the target category. Distractor stimuli (e.g., 3, C, Z) may be presented at any point and should be ignored. In the example input sequence, the first target category should be detected at the 4th character, while the second target category should be detected at the 10th character. All other stimuli should be ignored.

The following is a description of how PBWM handles the 1-2-AX in the example above. BG gates (element 108) input "1" into a PFC stripe. Then, the distractor input C creates transient activity in another PFC stripe while input 1 is maintained. BG gates (element 108) input A, part of the target category, into a PFC stripe, and input 1 continues to be robustly maintained. BG (element 108) allows a motor response (e.g., R for a right key press for recognition of the 1AX sequence or a left key press for recognition of the 2BY sequence) based on the contents of the working memory (element 112) and current input patterns, namely 1 and A, and X, respectively. If the motor response leads to reward, both the preference to store 1 and A in the working memory (element 112) and the motor response are facilitated for subsequent trials.

As described in Literature Reference No. 3, to apply PBWM networks to a pattern recognition problem, PBWM networks were constructed in the Emergent simulation environment (see Literature Reference No. 1) with four stripes: two for maintenance and two for output. These stripes comprise the working memory (element 112) component of the model. Output stripes are meant to model the immediate use of a working memory (element 112) component and its removal from working memory (element 112), while maintenance stripes hold working memory (element 112) components for longer time frames. Maintenance stripes received connections from input fields and were subject to adaptation through error driven learning. Output stripes received connections from the maintenance stripes only. A hidden layer received connections from all PFC stripes and the input fields. While PFC maintains a working memory (element 112) of previously seen objects, the hidden layer maps the contents of PFC, along with the current input to a motor response. This motor response corresponds to identifying a scene category (i.e., abstract category, element 114), such as with a button press or vocalization.

Four scene categories (scene classes) are defined in the table 800 shown in FIGS. 8A and 8B. These categories contain position and/or object invariance as a description. In addition to the four scene classes (1, 2, 3, and 4), non-target scenes were generated to provide counter-examples to the previously defined scene categories, as shown in FIG. 8B. Objects and positions are used in multiple classes to increase the difficulty of the task. For example, B is used in three scene classes (2, 3, and 4) and in the non-target class.

To represent the scenes to the network, input fields included both the object and the quadrant in which the object occurred. The former is meant to be the output of the temporal cortex ("what"). The latter is meant to correspond to the output of parietal cortex ("where"/"how").

During training, each network was trained until the sum of squared error (SSE) of the output field, averaged across all scenes, reached 0 for two consecutive epochs or 500 epochs was reached, whichever came first. An epoch contains all training scenes and the order of scenes was shuffled between epochs. With each foveation, a single object and its location was serially presented to the network with the category label and reward signal presented after the second foveation. The reward signal tells the network when to answer, but its amplitude is dictated by the match between the prediction of the network and the ground truth label.

Across several batches and distributions of scene categories, PBWM networks were able to successfully perform the pattern recognition task: 70% of the networks were able to reach 0 training error within 500 epochs. In testing, average percent correct across all successful weight initializations was 81.01%, which is far better than chance for 5 classes (20%).

Figure 9:
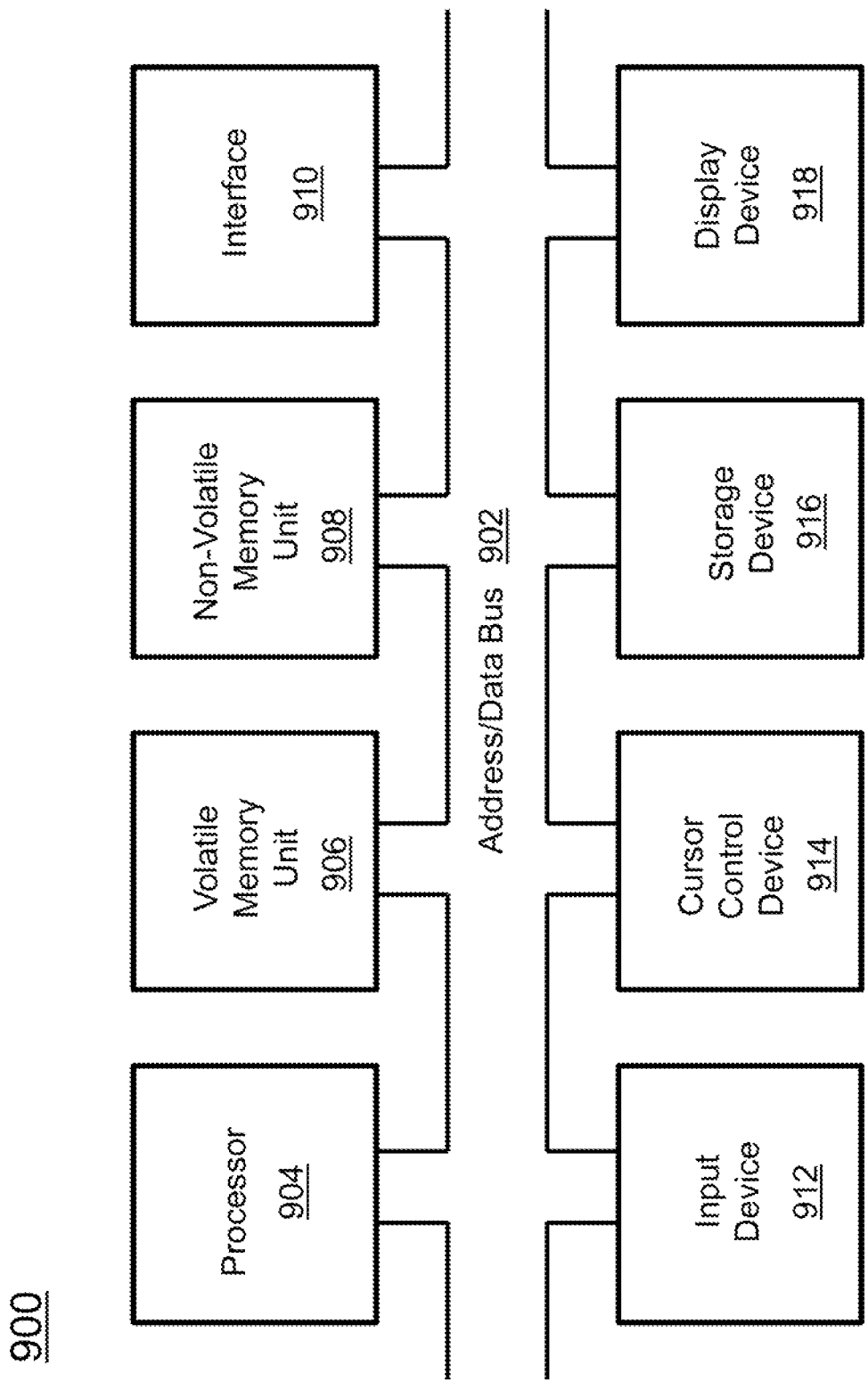
FIG. 9 is an illustration of a data processing system according to the principles of the present invention.

An example of a computer system 900 in accordance with one aspect is shown in FIG. 9. The computer system 900 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 900. When executed, the instructions cause the computer system 900 to perform specific actions and exhibit specific behavior, such as described herein.

The computer system 900 may include an address/data bus 902 that is configured to communicate information. Additionally, one or more data processing units, such as a processor 904, are coupled with the address/data bus 902. The processor 904 is configured to process information and instructions. In one aspect, the processor 904 is a microprocessor. Alternatively, the processor 904 may be a different type of processor such as a parallel processor, or a field programmable gate array.

The computer system 900 is configured to utilize one or more data storage units. The computer system 900 may include a volatile memory unit 906 (e.g., random access memory ("RAM"), static RAM, dynamic RAM, etc.) coupled with the address/data bus 902, wherein a volatile memory unit 906 is configured to store information and instructions for the processor 904. The computer system 900 further may include a non-volatile memory unit 908 (e.g., read-only memory ("ROM"), programmable ROM ("PROM"), erasable programmable ROM ("EPROM"), electrically erasable programmable ROM "EEPROM"), flash memory, etc.) coupled with the address/data bus 902, wherein the non-volatile memory unit 908 is configured to store static information and instructions for the processor 904. Alternatively, the computer system 900 may execute instructions retrieved from an online data storage unit such as in "Cloud" computing. In an embodiment, the computer system 900 also may include one or more interfaces, such as an interface 910, coupled with the address/data bus 902. The one or more interfaces are configured to enable the computer system 900 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 900 may include an input device 912 coupled with the address/data bus 902, wherein the input device 912 is configured to communicate information and command selections to the processor 900. In accordance with one aspect, the input device 912 is an alphanumeric input device, such as a keyboard, that may include alphanumeric and/or function keys. Alternatively, the input device 912 may be an input device other than an alphanumeric input device. In one aspect, the computer system 900 may include a cursor control device 914 coupled with the address/data bus 902, wherein the cursor control device 914 is configured to communicate user input information and/or command selections to the processor 900. In one aspect, the cursor control device 914 is implemented using a device such as a mouse, a track-ball, a track-pad, an optical tracking device, or a touch screen. The foregoing notwithstanding, in one aspect, the cursor control device 914 is directed and/or activated via input from the input device 912, such as in response to the use of special keys and key sequence commands associated with the input device 912. In an alternative aspect, the cursor control device 914 is configured to be directed or guided by voice commands.

In one aspect, the computer system 900 further may include one or more optional computer usable data storage devices, such as a storage device 916, coupled with the address/data bus 902. The storage device 916 is configured to store information and/or computer executable instructions. In one aspect, the storage device 916 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 918 is coupled with the address/data bus 902, wherein the display device 918 is configured to display video and/or graphics. In one aspect, the display device 918 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 900 presented herein is an example computing environment in accordance with one aspect. However, the non-limiting example of the computer system 900 is not strictly limited to being a computer system. For example, one aspect provides that the computer system 900 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 10:
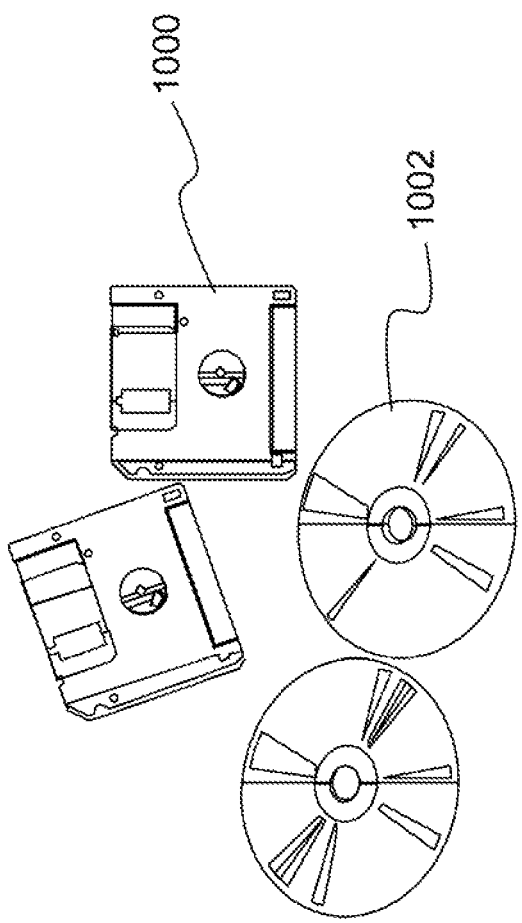
FIG. 10 is an illustration of a computer program product according to the principles of the present invention.

An illustrative diagram of a computer program product embodying the present invention is depicted in FIG. 10. As a non-limiting example, the computer program product is depicted as either a floppy disk 1000 or an optical disk 1002. However, as mentioned previously, the computer program product generally represents computer readable code (i.e., instruction means or instructions) stored on any compatible non-transitory computer readable medium.

What is claimed is:

1. A system for cognitive recognition, the system comprising:
    one or more processors and a non-transitory memory having instructions encoded thereon such that when the instructions are executed, the one or more processors perform operations of:
    receiving a multi-dimensional scene array of an environment surrounding a vehicle as input data, wherein the multi-dimensional scene array is obtained via at least one sensor that senses the environment;
    dividing the multi-dimensional scene array into a plurality of sub-arrays and outputting contents of a currently selected sub-array using a foveation module;
    generating, with a hierarchical clustering module, hierarchical groupings of features of the currently selected sub-array that discriminate various sequence components and groups of features, such that a plurality of levels of a hierarchy are defined, wherein features can exist in multiple levels of the hierarchy;
    selectively gating and maintaining only task-relevant sequence components of the hierarchy into a component memory location of a pattern bank within a working memory module using an input gating module, wherein task-relevancy is determined by reinforcement learning dynamics;
    determining if the task-relevant sequence components activate an abstract category module based on pattern matching between the task-relevant sequence components and patterns in the pattern bank;
    wherein if the task-relevant sequence components activate the abstract category module, then generating, with an executive control module, a category recognition label for the contents of the currently selected sub-array;
    using the category recognition label, determining whether to initiate a collision avoidance operation to cause the vehicle to proactively avoid a collision; and
    causing the vehicle to perform a collision avoidance operation to proactively avoid the collision.

2. The system as set forth in claim 1, wherein if the task-relevant sequence components do not activate a goal category of the abstract category module, then the one or more processors further perform an operation of selecting another sub-array and iterating through the operations until either the abstract category module is activated or all sub-arrays of the multi-dimensional scene array are processed without a pattern match.

3. The system as set forth in claim 2, wherein if all sub-arrays of the multi-dimensional scene array are processed without a pattern match, then the one or more processors further perform an operation of detecting, with the executive control module, partial pattern matches for the task-relevant sequence components in the current sub-array in a pattern storage module and copying each partial pattern match into a separate location in a hypothesis bank within the working memory module.

4. The system as set forth in claim 3, wherein for each partial pattern match, the executive control module revisits each task-relevant sequence component that was not detected and causes the foveation module to search for the task-relevant sequence component using different sensor parameters.

5. The system as set forth in claim 4, wherein the hierarchical clustering module decomposes the contents of the currently selected sub-array and outputs a spatially invariant representation of the sequence components that is defined by statistical distribution of the features, wherein features that exist in a larger percentage define higher levels in-the hierarchy.

6. The system as set forth in claim 5, wherein decomposition in the hierarchical clustering module is unsupervised and can be tuned to different levels of decomposition to adapt to various situations.

7. The system as set forth in claim 6, wherein the input gating module of the working memory module determines task-relevance through reinforcement learning dynamics, and wherein maintenance of the task-relevant sequence components is robust to delays.

8. A computer-implemented method for cognitive recognition, comprising:
an act of causing one or more processors to execute instructions stored on a non-transitory memory such that upon execution, the data processor performs operations of:
receiving a multi-dimensional scene array of an environment surrounding a vehicle as input data, wherein the multi-dimensional scene array is obtained via at least one sensor that senses the environment;
dividing the multi-dimensional scene array into a plurality of sub-arrays and outputting contents of a currently selected sub-array using a foveation module;
generating, with a hierarchical clustering module, hierarchical groupings of features of the currently selected sub-array that discriminate various sequence components and groups of features, such that a plurality of levels of a hierarchy are defined, wherein features can exist in multiple levels of the hierarchy;
selectively gating and maintaining only task-relevant components of the hierarchy into a component memory location of a pattern bank within a working memory module using an input gating module, wherein task-relevancy is determined by reinforcement learning dynamics;
determining if the task-relevant components activate an abstract category module based on pattern matching between the task-relevant components and patterns in the pattern bank;
wherein if the task-relevant components activate the abstract category module, then generating, with an executive control module, a category recognition label for the contents of the currently selected sub-array;
using the category recognition label, determining whether to initiate a collision avoidance operation to cause the vehicle to proactively avoid a collision; and
causing the vehicle to perform a collision avoidance operation to proactively avoid the collision.

9. The method as set forth in claim 8, wherein if the task-relevant sequence components do not activate a goal category of the abstract category module, then the one or more processors further perform an operation of selecting another sub-array and iterating through the operations until either the abstract category module is activated or all sub-arrays of the multi-dimensional scene array are processed without a pattern match.

10. The method as set forth in claim 9, wherein if all sub-arrays of the multi-dimensional scene array are processed without a pattern match, then the one or more processors further performs an operation of detecting, with the executive control module, partial pattern matches for the task-relevant sequence components in the current sub-array in a pattern storage module and copying each partial pattern match into a separate location in a hypothesis bank within the working memory module.

11. The method as set forth in claim 10, wherein for each partial pattern match, the executive control module revisits each task-relevant sequence component that was not detected and causes the foveation module to search for the task-relevant sequence component using different sensor parameters.

12. The method as set forth in claim 11, wherein the hierarchical clustering module decomposes the contents of the currently selected sub-array and outputs a spatially invariant representation of the sequence components that is defined by statistical distribution of the features, wherein features that exist in a larger percentage define higher levels in-the hierarchy.

13. The method as set forth in claim 12, wherein decomposition in the hierarchical clustering module is unsupervised and can be tuned to different levels of decomposition to adapt to various situations.

14. The method as set forth in claim 13, wherein the input gating module of the working memory module determines task-relevance through reinforcement learning dynamics, and wherein maintenance of the task-relevant sequence components is robust to delays.

15. A computer program product for cognitive recognition, the computer program product comprising computer-readable instructions stored on a non-transitory computer-readable medium that are executable by a computer having a processor for causing the processor to perform operations of:
receiving a multi-dimensional scene array of an environment surrounding a vehicle as input data, wherein the multi-dimensional scene array is obtained via at least one sensor that senses the environment;
dividing the multi-dimensional scene array into a plurality of sub-arrays and outputting contents of a currently selected sub-array using a foveation module;
generating, with a hierarchical clustering module, hierarchical groupings of features of the currently selected sub-array that discriminate various sequence components and groups of features, such that a plurality of levels of a hierarchy are defined, wherein features can exist in multiple levels of the hierarchy;
selectively gating and maintaining only task-relevant components of the hierarchy into a component memory location of a pattern bank within a working memory module using an input gating module, wherein task-relevancy is determined by reinforcement learning dynamics;

determining if the task-relevant components activate an abstract category module based on pattern matching between the task-relevant components and patterns in the pattern bank;

wherein if the task-relevant components activate the abstract category module, then generating, with an executive control module, a category recognition label for the contents of the currently selected sub-array;

using the category recognition label, determining whether to initiate a collision avoidance operation to cause the vehicle to proactively avoid a collision; and causing the vehicle to perform a collision avoidance operation to proactively avoid the collision.

16. The computer program product as set forth in claim 15, wherein if the task-relevant sequence components do not activate a goal category of the abstract category module, then the processor further performs an operation of selecting another sub-array and iterating through the operations until either the abstract category module is activated or all sub-arrays of the multi-dimensional scene array are processed without a pattern match.

17. The computer program product as set forth in claim 16, wherein if all sub-arrays of the multi-dimensional scene array are processed without a pattern match, then the processor further performs an operation of detecting, with the executive control module, partial pattern matches for the task-relevant sequence components in the current sub-array in a pattern storage module and copying each partial pattern match into a separate location in a hypothesis bank within the working memory module.

18. The computer program product as set forth in claim 17, wherein for each partial pattern match, the executive control module revisits each task-relevant sequence component that was not detected and causes the foveation module to search for the task-relevant sequence component using different sensor parameters.

19. The computer program product as set forth in claim 18, wherein the hierarchical clustering module decomposes the contents of the currently selected sub-array and outputs a spatially invariant representation of the sequence components that is defined by statistical distribution of the features, wherein features that exist in a larger percentage define higher levels in-the hierarchy.

20. The computer program product as set forth in claim 19, wherein decomposition in the hierarchical clustering module is unsupervised and can be tuned to different levels of decomposition to adapt to various situations.

21. The computer program product as set forth in claim 20, wherein the input gating module of the working memory module determines task-relevance through reinforcement learning dynamics, and wherein maintenance of the task-relevant sequence components is robust to delays.

* * * * *